Oct. 25, 1955
H. M. ADAMS
2,721,502
ROTARY SCRAPER
Filed Jan. 26, 1953
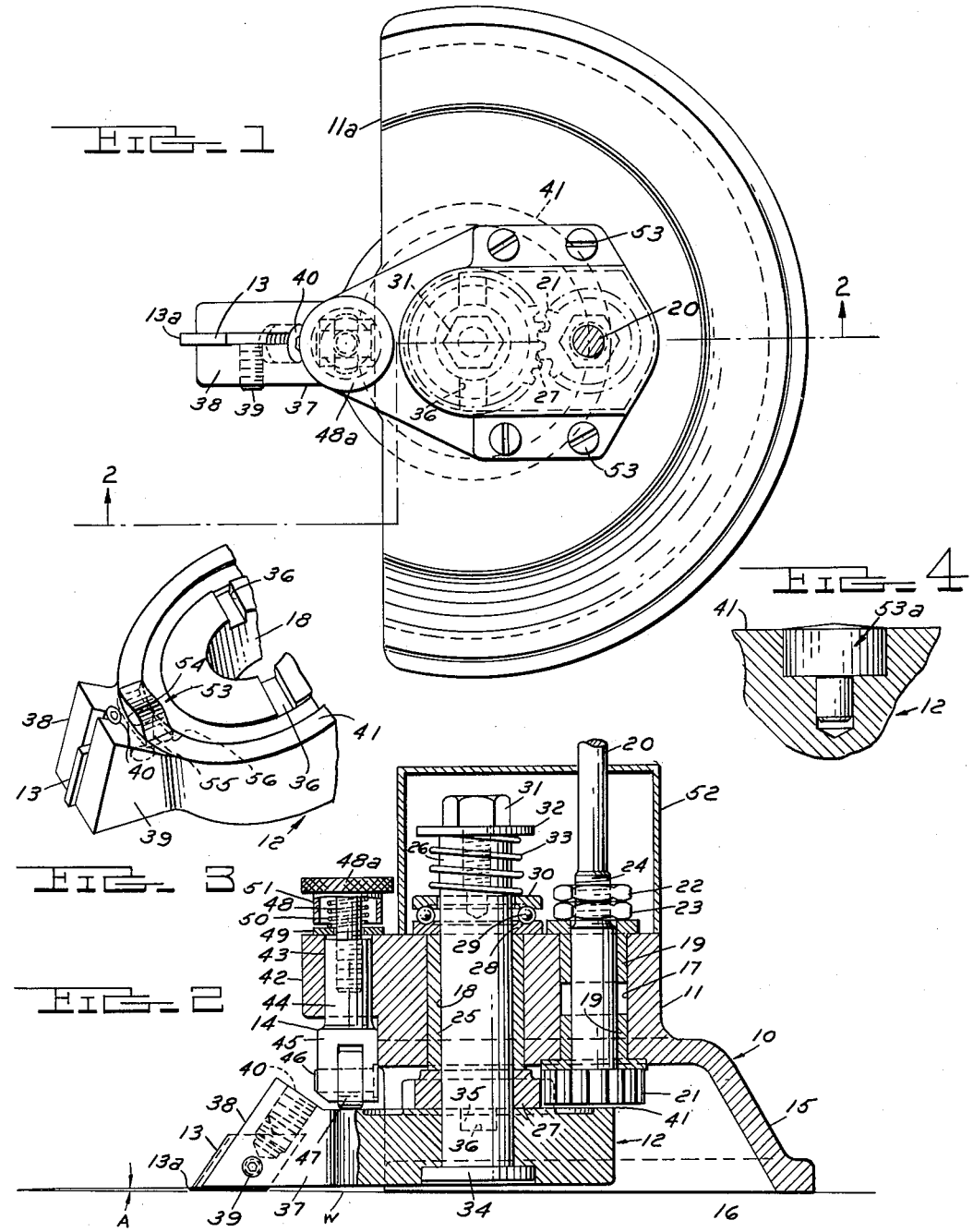
INVENTOR.
HARRY M. ADAMS
BY
ATTORNEY

United States Patent Office 2,721,502
Patented Oct. 25, 1955

2,721,502

ROTARY SCRAPER

Harry M. Adams, Berkley, Mich.

Application January 26, 1953, Serial No. 333,201

3 Claims. (Cl. 90—12)

This invention relates to a rotary scraper and more particularly to a hand operated, powered rotary scraper in which the operator may use both his sense of sight and his sense of touch to determine the proper amount of material to be removed by the scraper.

This invention is particularly suited, by way of illustration, for use in scraping surface plates or the ways of a machine, such as a milling machine, having a reciprocating element which must necessarily be fairly closely fitted into a channel but which must also be readily slidable with lubricant in the channel. To accomplish the desired close fit of the reciprocating element and yet have it readily slidable within the channel, the ways of the machine are scraped to provide slight depressions in which air or lubricant may be trapped to prevent sticking of the reciprocating element in the channel. The scraping of the ways has heretofore been done by hand because it is necessary that the person doing the scraping see what he is doing in order to properly space the depressions and also to scrape the ways to a proper depth. It is also desirable that the person doing the scraping be able to utilize his sense of touch in conjunction with his sense of sight in scraping the work to a proper depth.

Because of the requirements that the operator be able to see and "feel" his scraping, the prior art devices have not been especially suited to the type of metal scraping under discussion in that the prior art devices have had no provision for the operator to both see and "feel" his scraping while he is actually using the device.

With the foregoing in view it is a primary object of the invention to provide a rotary scraper which is mechanically power rotated but which enables the operator to judge by his sense of touch the proper tool bite and therefore the amount of material scraped off the surface.

A further object of the invention is to provide a rotary scraper which permits the operator to see the scraping as it is being done.

A further object of the invention is to provide a rotary scraper embodying cam means to effect engagement of the scraping tool with the work surface.

Another object of the invention is to provide a rotary scraper which embodies adjustable cam and adjustable depressing means whereby the operator can control the depth to which the scraper may cut.

A further object of the invention is to provide a rotary scraper in which the cutter is disposed at an angle to the work so that the cutter is effective only during a portion of its travel.

A further object of the invention is to provide a rotary scraper in which the scraper blade is angulated to enable scraping under overhanging parts of the work such as dovetails.

A further object of the invention is to provide a rotary scraper in which all the parts are readily accessible for cleaning, assembly, and disassembly.

Various other objects and advantages will be pointed out or will become apparent from a reading of the following specification taken in conjunction with the accompanying drawing in which:

Fig. 1 is a top plan view of the rotary scraper;

Fig. 2 is a side view of the rotary scraper partly in elevation and partly in cross-section, the view being taken along the line 2—2 of Fig. 1;

Fig. 3 is a fragmentary perspective view illustrating a modification of a portion of the device; and Fig. 4 is a fragmentary sectional view illustrating a modified form of cam.

Referring now to the drawing wherein like numbers refer to like and corresponding parts throughout the several views, the rotary scraper, generally designated by the numeral 10, essentially comprises a housing 11, a cutter body 12 disposed within the housing and journaled in the housing, a blade 13 carried by the cutter body, means for rotating the cutter body, and a plunger 14 journaled in the housing and adapted to be pressed against the cutter body.

More particularly, the rotary cutter body 10 comprises a housing having a preferably arcuate, substantially semi-circular, three dimensional configuration, as illustrated in Fig. 1, and outwardly flared peripheral supporting flanges 15. The housing 11 is cut off slightly beyond center as at 11a and it will be seen from Fig. 1 that an operator looking down at the scraper will be able to see the blade 13 as it rotates in that portion of its travel which lies outside the housing 11. The forward portion of flared flange 15 is ground off at a suitable angle A so that the scraper has a slightly forward cant for a purpose to be explained hereinafter. The bottom of the housing has a cavity 16 therein which constitutes the cutter body receiving chamber. The housing 11 is provided with a bore 17 and a bore 18 to provide means to mount shafts as will be more fully pointed out subsequently. The housing is preferably a casting of suitable material to combine strength and durability with predetermined weight.

Journaled in bore 17 by means of bearings 19 is a shaft 20 which projects into chamber or cavity 16 and carries a pinion 21 suitably secured thereon. The other end of the shaft projects upwardly through housing 11 and is adapted to be coupled to the shaft of an electric motor or flexible shaft drive (not shown). Shaft 20 is maintained in proper position by suitable means such as nuts 22, 23 threadedly engaging a collar 24 fitted around shaft 20.

Journaled in bore 18 by means of bearing 25 is the cutter body shaft 26 which projects through the housing 11 into cavity 16 and which carries a gear 27 keyed or otherwise suitably secured thereto. Gear 27 is adapted to mesh with pinion 21 so that rotation of pinion 21 causes rotation of gear 27 and shaft 26.

Atop housing 11 and fitting about shaft 26 is a thrust ball bearing assembly comprising a bottom washer 28 having a race therein, a top washer 30 having a cooperating race therein, and ball bearings 29 interposed between the washers. The top of shaft 26 is tapped for the reception of screw 31 about which and between the top of shaft 26 and the head of screw 31 is disposed a washer 32. Interposed between the two washers 30, 32 and encircling the shaft 26 is a compression spring 33. Spring 33 seats on washers 30, 32 and has a tendency to depressably elevate shaft 26.

Referring to the lower end of shaft 26, directly under gear 27, cutter body 12 is loosely mounted on shaft 26 and retained thereon by a flange 34 at the lower extremity of the shaft which seats in a recess 34a in the lower face of cutter 12. It is necessary that cutter body 12 rotate with gear 27 and to accomplish that objective the lower face of gear 27 is provided with a tongue 35 which extends across the diameter of the gear and is received in a cooperating groove 36 formed in the upper face of cutter 12. In this manner cutter body 12 is positively rotated by gear 27 without any possibility of slip between the two elements and without the necessity of keying cutter 12 to the shaft 26.

One radial side of cutter body 12 is provided with a radial extension 37 having an angular head 38 provided with a blade receiving notch therein. Blade 13 is held in head 38 by a set screw 39 passing through one side of head 38 and abutting blade 13. An adjusting screw 40 is provided in the upper end of head 38 for varying the distance the blade 13 projects below head 38. The angular construction of the head 38 permits an angular blade to be securely, but adjustably, mounted in the notch so that the tip 13a of the blade can scrape beneath overhanging portions of a channel or similar objects. The angular shape of blade 13 permits the blade's position to be changed four times before it must be removed for sharpening. The angular shape of the blade and head also permits an operator to scrape such awkward objects as dovetails.

On the upper face of cutter body 12 is provided an annular track 41 whose function will presently be explained.

The forward side of the housing 11 is provided with a forwardly projecting overhanging portion 42 having a vertical bore 43 therethrough. Journaled in bore 43 is a plunger 44 terminating at its lower end in a rectangular, bifurcated wheel support 45. Extending through wheel support 45 is an axle 36 on which is mounted a wheel 47 which is adapted to ride on track 41 of cutter 12. It should be noted that one side of wheel support 45 fits closely adjacent housing 11 to prevent turning of wheel support 45. Axle 46 is provided at one end with a head which fits into a recess in wheel support 45 and is adapted to lie adjacent housing 11 to prevent accidental displacement of axle 46.

The upper end of plunger 44 is tapped to receive a threaded bolt 48 which may be provided with a knurled cap 48a to facilitate turning thereof. Loosely encircling the shank of plunger 48 and lying atop overhang 42 is a washer 49. Seated on washer 49 and encircling plunger 48 is a compression spring 50 adapted to exert a force against the under side of knurled cap 48a to elevate plunger 44. Interposed between cap 48a and washer 49 is a ring 51 whose function it is to contact washer 49 when plunger 44 is depressed and thereby prohibit further depression of plunger 44. The distance that plunger 44 may be depressed can initially be determined by unscrewing bolt 48 to increase the distance or by screwing bolt 48 to decrease the distance.

A cover plate 52 is secured to the portion of the housing 11 through which shafts 20 and 26 project. Cover plate 52 has an aperture therein through which the upper end of shaft 20 extends and to which may be connected a motor. The cover plate may be secured to the housing by any suitable means such as screws 53.

To operate the rotary scraper just described, an electric motor or flexible shaft drive (not shown) is coupled to shaft 20 and started. Rotation of the motor causes pinion 21 to drive gear 27, and, consequently, cutter body 12 is rotated. Owing to the cant of the scraper caused by the grinding off of flared supporting flange 15, the blade carrying head 38 is closer to the surface of the work W than the other end of cutter body 12 when the cutter body is in the position shown in the drawing. Blade 13 will have been adjusted so that it just contacts the surface. To begin scraping, the operator presses upon knurled cap 48a with his thumb and this force is transmitted through plunger 44 to cutter body 12 causing the cutter body to be moved downwardly compressing spring 33. As cutter body 12 rotates, wheel 47 rides on track 41 maintaining cutter body 12 in its depressed condition. Because of the cant of the scraper, blade 13 contacts the surface of the work W only in the forward direction. The length of contact of blade 13 with the surface is determined by the angulation of the scraper to the work as defined by the grinding off of the flared flange 15 but the preferred length of contact is usually between 5–15 degrees of rotation. The operator must maintain pressure on plunger 44 to keep cutter body 12 depressed in the scraping position. The maximum distance cutter body 12 may be depressed is equal to the clearance between ring 51 and washer 49 which may be set in advance.

Owing to the fact that the bottom of the housing has been ground off at an angle, the rotary scraper is canted forwardly with respect to the surface of the work W so that the blade 13 will scrape the surface during only a portion of its travel and that portion is outside the housing where the operator may see the results of the scraping. Because the operator must keep the plunger depressed during the scraping operation, the vibration of the blade as it scrapes along the surface of the work is transmitted through the plunger to the operator's hand enabling him to judge the scraping through his sense of touch. In this manner the operator has what is termed "feel" control over the scraping.

When the operator determines that sufficient material has been scraped, or when ring 51 contacts washer 49, he removes his thumb from knurled cap 48a and spring 50 elevates plunger 44 thereby removing pressure from cutter body 12. At this point spring 33 expands and elevates cutter body 12 thereby restoring the cutter body to the inoperative position.

In the modification shown in Fig. 3, that portion of track 41 adjacent the angular head 38 is interrupted by a substantially T-shaped cam 53 having an arcuate camming surface 54 and a shank 55. Track 41 is provided with a slot 56 into which cam 53 is adapted to fit so that the sides of the cam are flush with the track and with the arcuate camming surface 54 extending above track 41 as an elevated continuation thereof. The exact configuration of the camming surface 54 may be varied to suit the requirements of individual jobs, and in Fig. 4 is shown one example wherein the camming surface of cam 53a is in the shape of a button. The operator may make his own cam by machining a piece of metal to a button head having any desired height and slope. With the devices shown in Figs. 3 and 4, the base may or may not be angularly ground off as desired.

When using the modified scraper, the plunger 44 is adjusted so that the cutter body 12 may rotate in its elevated or inoperative position without cam 53 or 53a coming in contact with wheel 47. When it is desired to scrape a surface, plunger 44 is depressed, wheel 47 rides on track 41 and depresses cutter body 12 until blade 13 contacts the surface of the work W. As cam 53 or 53a begins contact with roller 47, two forces are exerted, each in an opposite direction. The camming surface, standing above track 41, pushes against plunger 44 and tends to force it upwardly, while the pressure exerted by the operator on plunger 44 tends to force the cutter downwardly. The result of these two forces is to impart a resilient, dynamic action to the cutter body so that at the exact point desired to be scraped there is a slight hammer effect on the surface of the work W which aids in scraping.

It is obvious that in the device of Fig. 3 the cam surface 54 may be formed integral with the track 41 and that the cam surface may be any selected configuration. The removable cam elements shown in Figs. 3 and 4 facilitate substitution of cams of various shapes and heights in the device without the necessity of removing other parts from the scraper.

While the invention has been shown and described in detail, it is obvious that the invention is susceptible of many changes in gearing, size, shape, detail, and arrangement of the various elements within the scope of the appended claims.

I claim:

1. A rotary scraper comprising a substantially semicircular arcuate housing having a depending flange for slidably positioning said housing on a workpiece surface so as to support said housing and form a cavity between said housing and the supporting surface, a shaft axially disposed in said arcuate housing, a spring biasing said shaft axially upwardly, an annular cutter supporting body fixed on said shaft adapted to be rotated by said shaft within the cavity formed by said housing in the area of said housing and to continue its rotation outside the area of said housing, a radial extension on said body, a cutter on said extension, means for rotating said shaft; said spring normally biasing said cutter out of workpiece contact; a projection on said housing in the area of said body rotation outside said housing, a plunger in said projection depending in the area of said cutter supporting body, and a cam portion on said cutter supporting body adapted to contact said plunger to move said body axially downwardly against said spring biased shaft in the area of said plunger so as to bring said cutter into contact with the supporting surface to scrape same during its rotary motion in an area outside said housing thereby enabling the operator to view scraping operations.

2. In a scraper as set forth in claim 1, anti-friction bearing means on said plunger for riding said body and for contacting said cam portion.

3. Said plunger being adjustable relative to said body so as to vary camming action therebetween.

References Cited in the file of this patent

UNITED STATES PATENTS

| | | |
|---|---|---|
| 768,366 | Hughes | Aug. 23, 1904 |
| 1,086,368 | Huyck | Feb. 10, 1914 |
| 1,394,564 | Lindgren | Oct. 25, 1921 |
| 1,461,615 | Hermanowich | July 10, 1923 |

FOREIGN PATENTS

| | | |
|---|---|---|
| 47,349 | Sweden | July 14, 1920 |